United States Patent [19]
Montalbano

[11] Patent Number: 6,019,924
[45] Date of Patent: Feb. 1, 2000

[54] EXTRUSION DIE WITH ADJUSTING SLIDING DIE LIPS AND METHOD OF USE

[75] Inventor: John S. Montalbano, Baldwinsville, N.Y.

[73] Assignee: Black Clawson Company Inc., New York, N.Y.

[21] Appl. No.: 09/091,694

[22] PCT Filed: Jan. 14, 1997

[86] PCT No.: PCT/US97/00526
§ 371 Date: Jun. 17, 1998
§ 102(e) Date: Jun. 17, 1998

[87] PCT Pub. No.: WO97/27990
PCT Pub. Date: Aug. 7, 1997

Related U.S. Application Data

[60] Provisional application No. 60/010,940, Jan. 31, 1996.

[51] Int. Cl.[7] .................................................. B29C 47/16
[52] U.S. Cl. ...................... 264/176.1; 425/141; 425/381; 425/466
[58] Field of Search ...................... 264/176.1; 425/141, 425/381, 466

[56] References Cited

U.S. PATENT DOCUMENTS

| | | | |
|---|---|---|---|
| 3,940,221 | 2/1976 | Nissel | 425/141 |
| 4,248,579 | 2/1981 | Maejima | 425/227 |
| 4,592,710 | 6/1986 | Reifenhauser et al. | 425/141 |
| 4,753,587 | 6/1988 | Djordjevic et al. | 425/140 |
| 4,781,562 | 11/1988 | Sano et al. | 425/141 |
| 4,863,361 | 9/1989 | Boos | 425/141 |
| 4,990,079 | 2/1991 | Lorenz | 425/141 |
| 5,020,984 | 6/1991 | Cloeren et al. | 425/141 |
| 5,051,082 | 9/1991 | Hattori et al. | 425/141 |

FOREIGN PATENT DOCUMENTS 62-169615  7/1987  Japan.

*Primary Examiner*—Robert Davis
*Attorney, Agent, or Firm*—Biebel & French

[57] ABSTRACT

A thermal actuator system controls the position of a moveable die lip (32, 34) on a flat film extruder die (30) to control the gauge of the extruded plastic film, and includes thermal actuators each of which has an outer thermal bolt (70) and an inner bolt (80) extending through the outer bolt. The inner and outer bolts have outer ends which are connected together, while the outer bolt is connected to the die body and the inner bolt has an operative end connected to a die lip. An air passage (90) is formed between the inner and outer bolts and through which air is applied for cooling the inner bolt with respect to the outer bolt. Thermal expansion of the outer bolt is controlled by an external heater (75) mounted on the outer bolt.

7 Claims, 10 Drawing Sheets

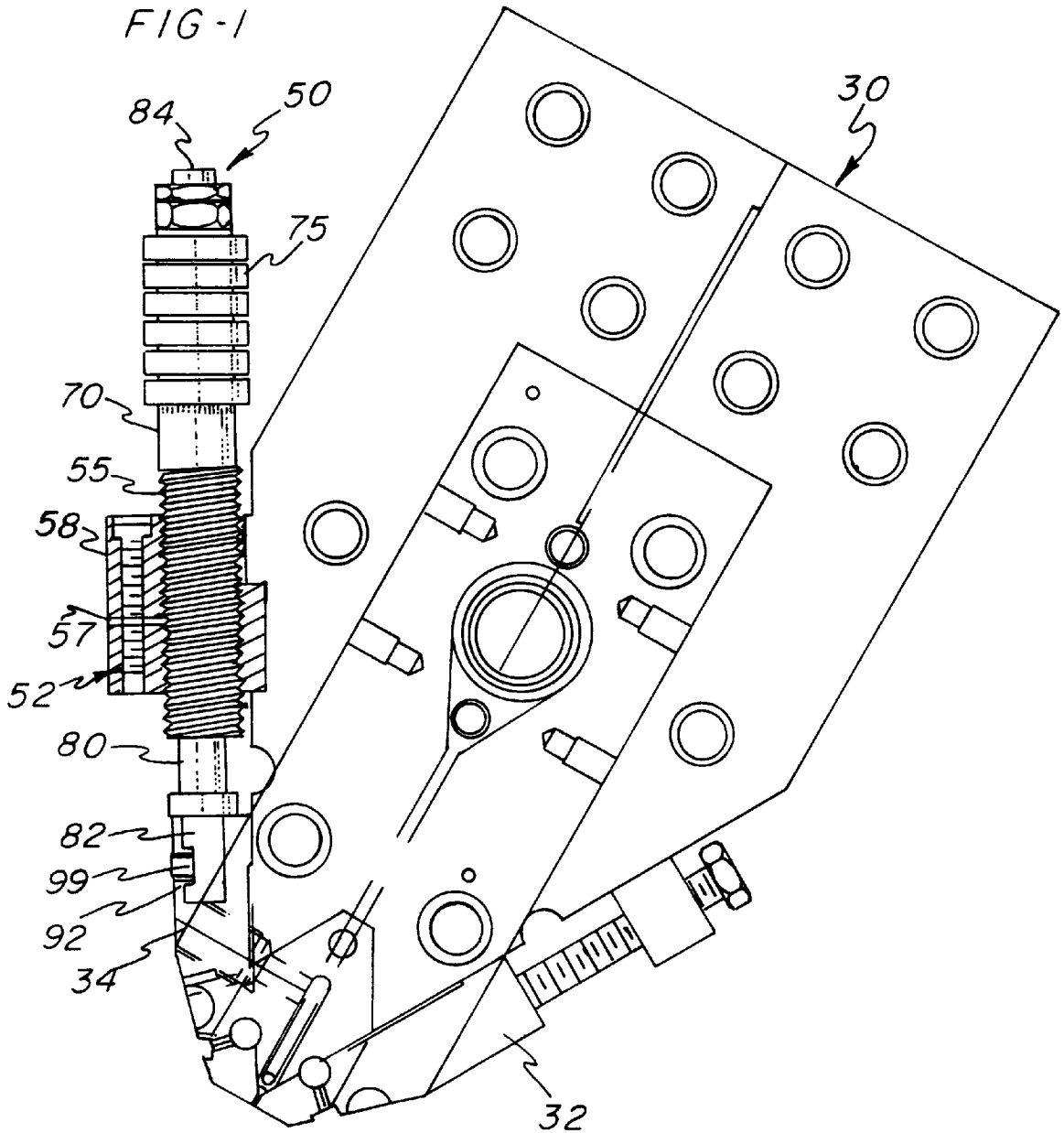

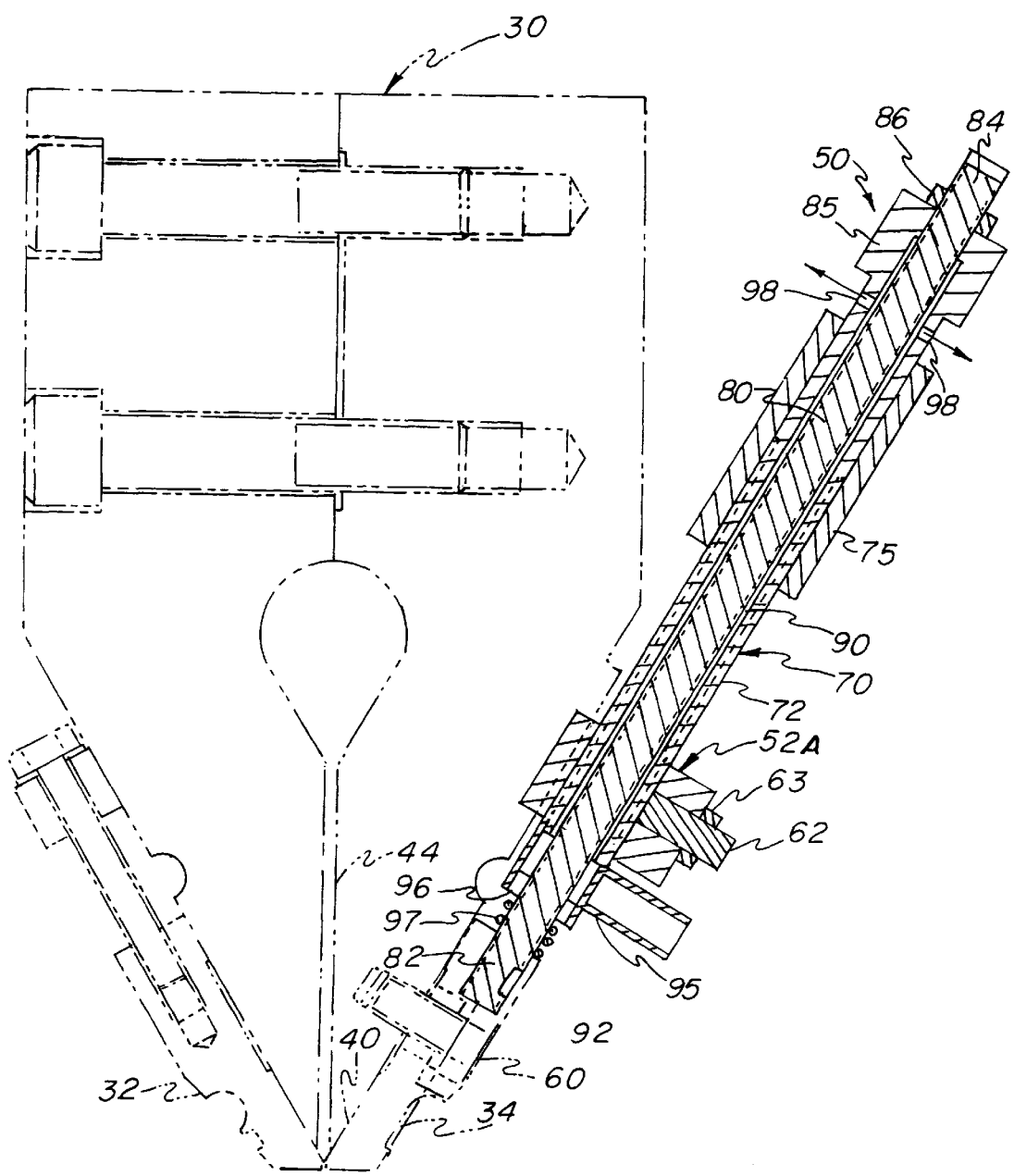

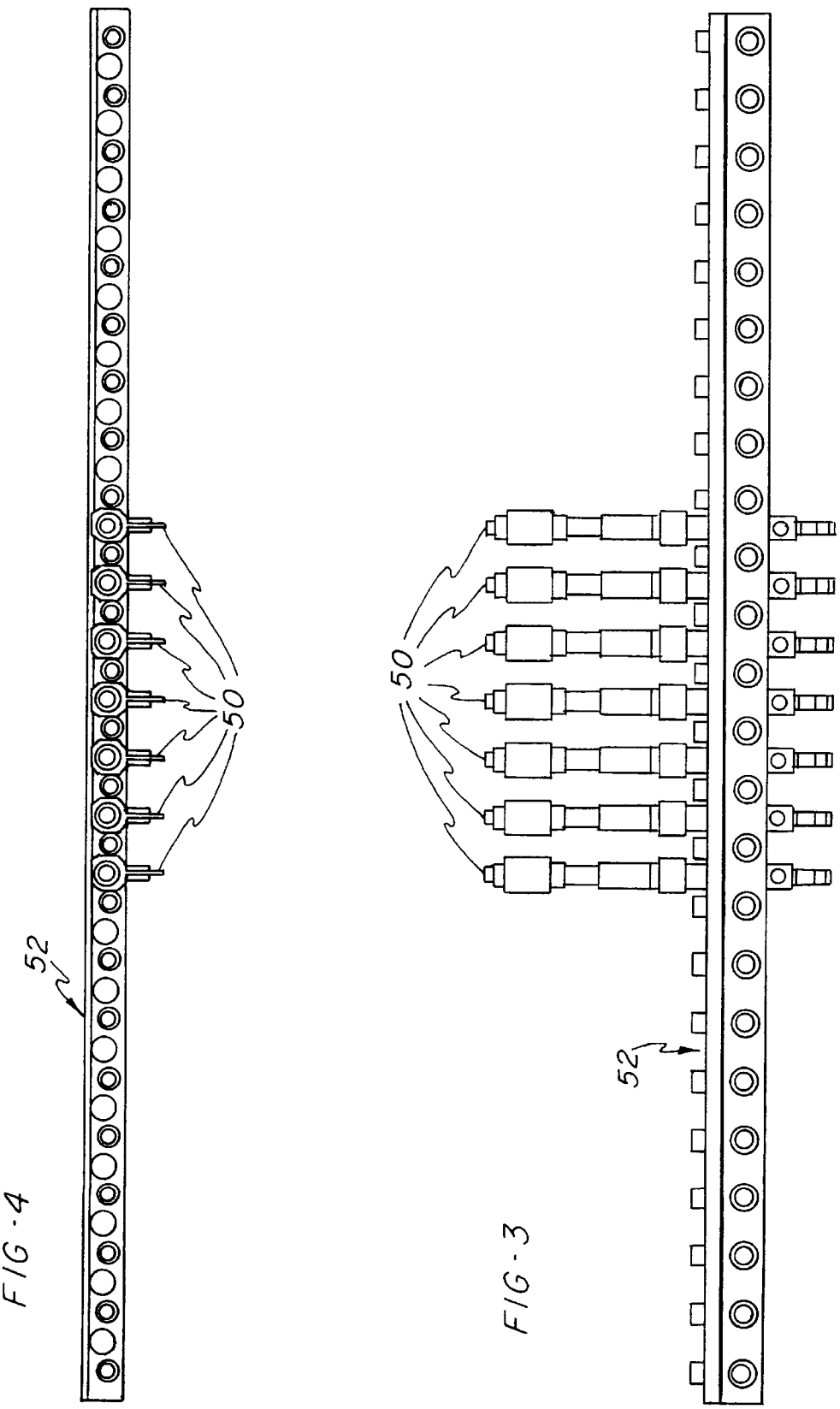

EXTRUSION DIE WITH ADJUSTING SLIDING DIE LIPS AND METHOD OF USE

This application claims benefit of provision application 60/010940, filed Jan. 31, 1996.

BACKGROUND OF THE INVENTION

This invention relates to the field of controlling the extrusion gap between a pair of die lips for forming sheet material, as an example.

It has been well known to move one or more die lips with respect to the another in response to the measurements taken by a downstream guage or thickness measuring apparatus, to control the thickness of the extrudate. A widely used arrangement includes the selective heating and/or cooling of extensible die bolts, one end of which is anchored and the other end of which causes the flexure of one die lip with respect to another die lip. Such arrangements are shown in Nissel U.S. Pat. No. 3,940,221, Cloeren et al. U.S. Pat. No. 5,020,984 and in Hatori et al. U.S. Pat. No. 5,051,082, as examples.

A particular disadvantage of the apparatus as shown, for example, in the above referenced patents is the fact that the hinged or flexible die lip, when biased or flexed differentially, such as at a series of longitudinal positions along the die, causes a distortion in the gap and therefore causes a non-uniformity with respect to the surface of a deckle rod which may be positioned within the die. Such distortions and lack of uniformities can cause leakage past a deckle rod.

External sliding as adjustable die lips arranged as opposed pairs, have been used in combination with die bodies. These die lips provide opposed extrusion land surfaces which are in alignment with an extrusion slot in the die body, but are separate from the die body itself, so that the die lips may be mechanically adjusted by relative sliding movement along beveled lower surfaces of the die body, to open or close an extrusion gap. Typical externally mounted and adjustable die lips, in combination with a deckle rod system, are shown in Maejima U.S. Pat. Nos. 4,248,578 and 4,659,302. In these patents, an internal seal at the extrusion gap is formed with the sloping inside surfaces of the adjustable die lips, such as rod 6 and die lip 17 of patent U.S. Pat. No. 4,248,579. An advantage of this known type of system is that adjustment of the extrusion gap does not cause a change in geometry of the seating surfaces of the deckle rod on the sloping inside surfaces of the die lips. To Applicant's knowledge, no prior satisfactory arrangement has been proposed by which a solid sliding external die lip of the kind shown in the Maejima patents has been actuated by thermal actuation.

A further difficulty and limitation inherent to many of the prior thermal bolt actuators resides is the fact that the die slot or gap is closed by the application of heat which expands the die bolt. At the same time, the heat is not effectively isolated from the die body and the heat causes a decrease in the polymer viscosity within the extrusion slot. This decrease in polymer viscosity runs counter to the decrease in slot width, by tending to increase the rate of polymer flow. Accordingly, accurate control of guage thickness can become difficult to achieve.

U.S. Pat. No. 5,051,082 describes a system in FIG. 11 of that patent in which, working through a flexible or bendable die hinged die lip, the gap is increased with increasing die bolt temperature and the gap is decreased with decreasing die bolt temperature, in combination with an airflow arrangement for cooling the die bolt. The die bolt itself is formed with an aperture throughout a major portion of its length providing a passageway for the air to flow for cooling the die bolt. The cooling air is brought into the die bolt by an air feed tube which is common to all of the die bolts. This arrangement puts all of the die bolt cooling systems in series with each other and at a constant cooling bias, with the result that any one die bolt could be heated or cooled at a time when it needs to be heated. Further, heat migration, which is undesirable for control purposes, is intentionally allowed to flow into the die body so that the viscosity of the molten resin is changed at the same time that the die lip is undergoing adjustment.

SUMMARY OF THE INVENTION

The invention is directed to apparatus and method for the controlling of the relative position of one or more rigid slidable die lips on an extrusion die, using a novel thermal die bolt actuator module. The invention is also directed to an improved actuator system. While particularly adapted for use in the positioning of an external sliding die lip, the system could also be used for the positioning or control of a flexible integral die lip.

A particular advantage of the actuator system of this invention is the fact that it can generate the force which is required to both bend and slide a portion of the rigid die lip on the die body, to effect a change in die gap. As previously mentioned, this sliding (or selective sliding) of the die lip does not adversely effect the trueness of the sealing surface with the sealing rod or deckle rod, as employed in an internally deckled extrusion die. The design of this invention can generate a force sufficient to bend the rigid die lip along its thicker longitudinal axis, while the strength of the actuator and the modulus of the components prevent permanent deformation of the actuator rods and components. Each of the die bolts modules is individually heated and individually cooled, as required, and are isolated from each other, and from the die body.

The die bolt actuator module of the present invention has a heated portion but it is not that portion which is connected to the die lip. A tubular or annular heated bolt surrounds an inner non-heated rigid bolt and the non-heated bolt or inner bolt is connected to the die lip, while the concentric bolts are joined together at their remote ends. Therefore, the heat which is applied to the outer annular bolt is not directly applied to the die lip but rather is isolated by an air gap between these inner and outer members. This air gap or chamber is provided with a cooling air inlet at its lower end and with cooling air outlets at its upper end, thereby providing a flow path in the space between the bolts for the cooling of the outer or annular heated bolt, when required, and the isolation of the non-heated inner bolt.

The module arrangement is such that the heat which migrates from the outer bolt will be first to the large mass of the screw support bar and secondly to the even larger mass of the die body itself and, as a result, will have very little effect on the polymer viscosity, or on the flow rate dependent on viscosity. Thermal variations and disturbances are held to a minimum.

The components are designed in the assembly or module always to maintain the parts under an elastic deflection within the limits of the material used. The length of the bolts are designed such that even with no relative lip deflection, the bolt will remain below its yield deflection limit and will not be permanently deformed.

The invention contemplates applying die bolt modules to die lips on both sides of the die, but offsetting their center lines from the front to the back of the die thereby allowing 1× spaced control centers with a rigid sliding die lip, with the die bolt modules on each side of the die at 2× center spacing.

The system design is such as to be able to withstand full expansion or contraction movement of the outer (annular) bolt with no movement of the inner bolt and without sustaining any damage to the actuator module. It is also necessary to limit the gross or total amount of force applied to one of the sliding die lips to prevent permanent deformation of the lip and, at the same time, prevent the actuator from having a permanent deformation. The predetermined expansion/contraction of the system dictates the length of the die bolt system to ensure that the maximum stress which the modules will experience remains within the elastic limit of the material used.

It is accordingly an important object of the invention to provide an actuator module particularly adapted for the control of the position and bending of a sliding external die lip, in which an outer annular bolt surrounds an inner non-heated bolt thereby defining an airspace therebetween forming a cooling passageway for air. The outer bolt, when heated, operates via the inner bolt to increase the extrusion gap between the die lips, and when cooled, to decrease the extrusion gap.

Another object of the invention is the provision of a system for sliding, accompanied by bending, of a longitudinally rigid die lip attached to or supported on an exterior surface of a die.

A still further object of the invention is the provision of a force module for positioning a die surface, in which migration of heat to the die body and/or to the die lips is maintained or held at a minimum.

Other objects and advantages of the invention will be apparent from the following description, the accompanying drawings and the appended claims.

BRIEF DESCRIPTION OF DRAWINGS

FIG. 1 is an end view of a flat film extrusion die having relatively rigid external die lips and one embodiment of thermal modulator or actuator in accordance with this invention;

FIG. 2 is a sectional view of a preferred embodiment of the thermal actuator die bolt, and showing the outline of the die in broken lines.

FIG. 3 is a side elevation of the actuator support bar of FIG. 2 showing a plurality of the actuators in assembled relation on the bar;

FIG. 4 is an elevational view of the bar assembly of FIG. 3;

DESCRIPTION OF FIG. 6

Figure 6:
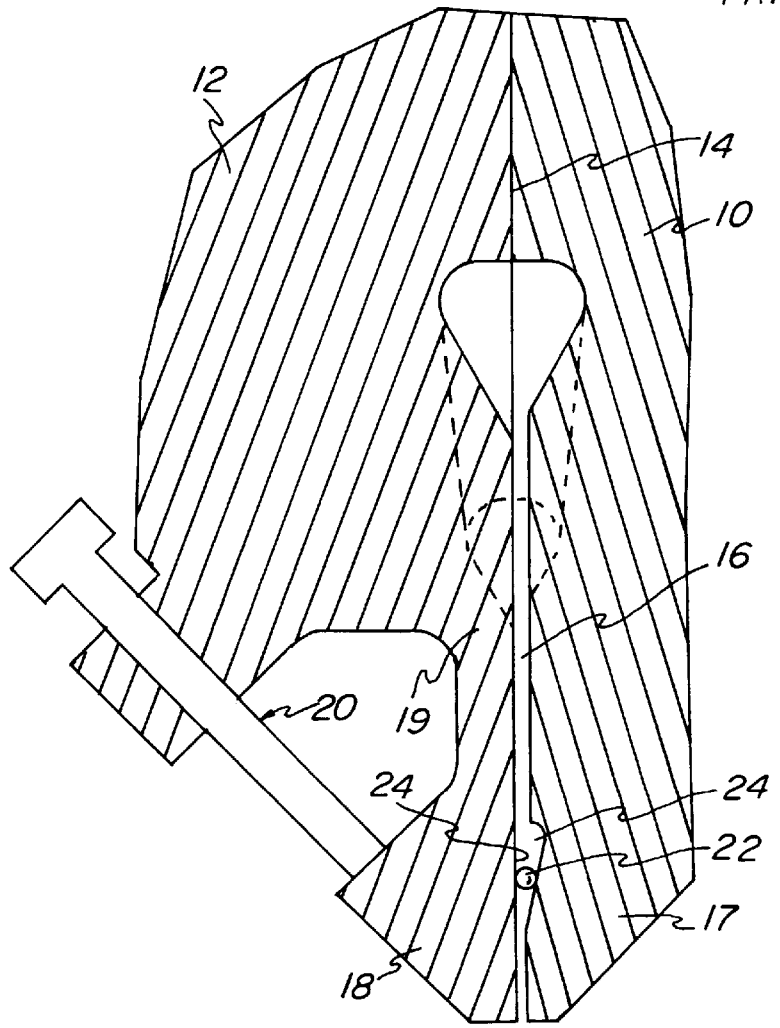
FIG. 6 is a fragmentary sectional view through a prior art die body having an integral flexible lip and a thermal actuator die bolt and illustrating how distortions in the die lip adversely affect sealing at a deckle rod.

FIG. 6 is representative of a substantial body of prior art. The two piece die body parts 10 and 12 are joined along a common line 14 and defines an extruder slot 16 therebetween. A fixed die lip 17 opposes a moveable die lip 18. The lip 18 is moveable through a integral hinge 19. A thermal die bolt 20 is positioned on the body part 12 to bear against the lip 18, and the movement or actuation force may be one which closes the die lips with increasing heat or, as described above in connection with patent U.S. Pat. No. 5,051,182 (FIG. 11), opens the die lip with increasing heat. In either case, a deckle rod 22 must seat against a wall of the lip 18 and against a common secondary manifold wall 24. Since the forces applied by the longitudinally spaced series of die bolts 20 is not uniform, the die lip sealing surfaces are distorted by reason of the non-uniform application of a bending force of the die lip 18. This lack of uniformity creates a non-planar surface in the wall 24 which can cause leakage past the deckle rod 22.

DESCRIPTION OF PREFERRED EMBODIMENTS

Figure 5:
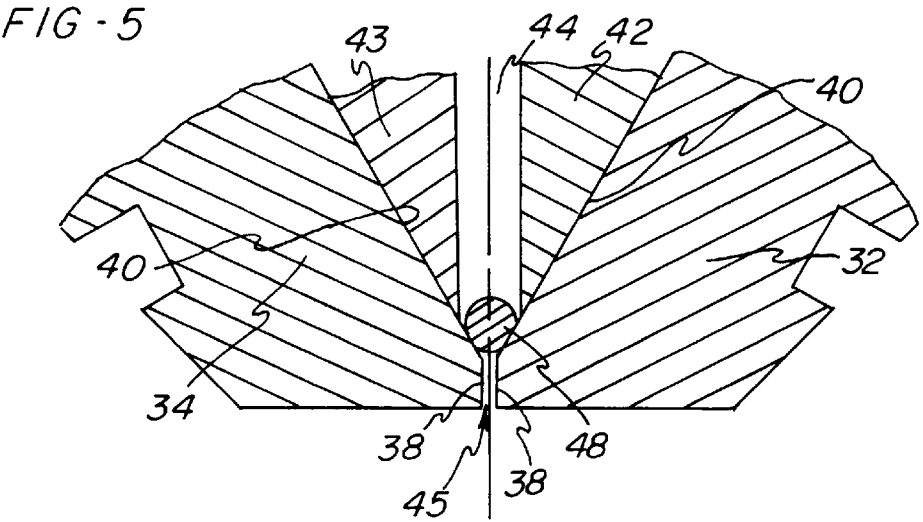
FIG. 5 is an enlarged fragmentary sectional view through the die body and the die lips showing the extrusion lands or slots in relation to a pair of external slidable die lips and also showing the relation of the deckle rod with respect to the tapered seal surfaces of the die lips.

Referring first to FIG. 1, an end view of a flat film die 30 is illustrated, in which a pair of external sliding die lips 32 and 34 are supported. The die lips 32 and 34, as better shown in FIG. 5, define opposed land surfaces 38 which form an extrusion gap or slot. These die lips adjustably slide on the die body along inclined surfaces 40 which are mated with corresponding exterior surfaces of the mating die body portions 42 and 43. The body portions together, define therebetween a extrusion gap or slot 44 which is wider than the slot 45 defined by the opposed surfaces 38 of the die lips. As shown in FIG. 5, the deckle rod 48 rests on the converging die lip surfaces 40, and movement of either of the die lips 32 or 34 in a plane parallel to the abutting surfaces of the body portions 42 and 43 does not disturb the seated relation of the deckle rod 48 with respect to the surfaces 40.

The thermal actuators 50 of this invention, as illustrated in FIGS. 1 and 2, are spaced longitudinally along one or both of the die body portions, such as the portion 34, on an elongated actuator clamping and supporting bar 52. FIGS. 3 and 4 show the elongated bar 52 supporting a plurality of the actuators 50 thereon.

It is important that the actuator 50 be firmly secured to the actuator support bar 52 and that the actuator support bar 52 be firmly secured and locked to one of the die body portions, such as by bolts (not shown).

The actuator 50, in its preferred embodiment, is described in greater detail in connection with the sectional view of FIG. 2. In FIG. 1 it is shown as having exterior threads 55 which are received within internal threads within the support bar 52. In the embodiment as shown in FIG. 1, the bar 52 is split at 57 to form a gap, and a clamp, by which the actuator 50 may be secured to the bar, by a tie bolt through the aperture 58. Such a bolt would be accessible to the operator, and permits a retrofit into existing lines in which automatic actuation has not been available.

The die lips are mounted to the die body by means of shouldered bolts 60 (FIG. 2) which provide for limited sliding movement of the die lips along the surface 40 to widen or close the gap or slot 45 defined between the opposed surfaces 38. Either or both of the die lips 32, 34 may be moved by the actuator 50 of this invention.

In the adjusting movement of any of either of the die lips 32 or 34, in order to effect guage adjustments along the full longitudinal length of the die, it is necessary to exert a force in a plane parallel to the associated surface 40 at longitudinally spaced positions along such plane. The die lip 32 or 34 will be caused to be bent or distorted somewhat about its long axis in making these guage adjustments, as necessary. And the actuator components are operated under stress within the limits of the actuator components.

A preferred form of an actuator according to this invention is shown in the sectional view of FIG. 2. The actuator support bar 52a is a modification of that shown in FIG. 1 in that, in lieu of the slit 57 and the clamping function, the actuator bar 52a is provided with a tapped opening for receiving a set screw backlash screw 62 which may be run in and into physical engagement with the actuator body, at the external threads, and locked by a lot lock nut 63 to provide an anti backlash attachment.

The improved thermal actuator of this invention, is shown in FIG. 2, includes an outer annular heat extensible bolt 70 forming a body of the actuator. A portion of the outer surface of the annular bolt 70 is threaded at 72 to be received within the bar 52a for adjustably supporting the actuator in relation to the position of the associated die lip.

The outer annular bolt 70 supports, along its length, an electric heater diagrammatically illustrated at 75, by which the die bolt 70 may be heated.

The actuator also includes an inner bolt 80 received within the annular bolt 70 and having an inner end 82 extending through the inner end of the annular bolt. The inner bolt 80 also has an outer end 84 which extends outwardly of the outer end of the annular bolt through an opening in the enlarged outer end 85 and secured in a predetermined adjusted position to the outer end 85 of the annular bolt by a jamb nut 86 threaded on the inner bolt. In this manner, the respective outer ends of the inner and outer bolts are mechanically joined together.

The inner and outer bolts define therebetween an air gap or space 90 through which cooling air may flow along the inner bolt to isolate and cool the temperature of the inner bolt 80, with respect the outer bolt 70.

A cooling air inlet collet 95 is received over the lower end 82 of the inner bolt 80 and sealed by a peripheral seal 96 and maintained in position by a compression spring 97 threaded over the inner end 82. The collet 95 provides an air inlet leading into the interior passageway 90 for flow along the length of the inner bolt. The outer end of the annular bolt is provided with one or more air outlet openings 98 through which cooling air may be expelled.

The lower or inner end 82 of the inner die bolt 80 is threaded into the associated die lip 32 or 34 and an adjusted position may be established by a set screw 99 through the die lip body and into the notch 92 on the end 82.

As an example of operating conditions, the cooling passageway 90 and the air flowing therethrough from the inlet collet 95 to the outlet openings 98 may provide a temperature of the inner bolt 80 not much in excess of the die temperature, typically about 300° F. At the same time, the outer annular bolt 70 may be heated by the heater 75 to a temperature of 900° F., for example. The linear expansion of the outer bolt results in a lifting of the respective ends 84, 85 of the bolts and a pulling action of the inner end 82 with respect to its attachment to the associated die lip. Therefore, the application of heat results in a widening of the extrusion gap 45 and the removal of heat results in the narrowing of the extrusion gap without substantially effecting the temperature of the die body or the die lips or the viscosity of the material being extruded therethrough.

A plurality of the actuators may be positioned along the bar 52 or 52a in spaced relation such as on 2 inch centers. For finer control, a corresponding group of actuators may be applied to the opposite die lip and located on centers which are intermediate those of the first set of actuators.

As noted above, the individual actuators 50, in operation, are designed so that they cannot be stressed beyond the elastic limit of the components, particularly the elastic limit of the inner or outer bolts, to cause a permanent deformation in such parts. The die lip body 32 (or 34) during adjustment, may be caused to be bent or distorted along its long axis, that is its axis parallel to the plane of force application by the actuators, in order to accommodate fine adjustment of the guage of the film extrudant at any given transverse location of the die slot. With the actuators according to this invention, this is accomplished by applying forces to the die lip, by adjusting the power applied to the respective heaters 75 while maintaining a constant cooling bias by flow of air along the inner bolt 80. The strengths built into the actuator in the inner and outer die bolts at the actuating temperatures are greater than the bending and distortional forces applied by or to any single actuator so that, under extreme conditions, the actuator components cannot be stressed beyond their elastic limits. Accordingly, a fewer or greater number of actuators may be employed, for any die lip, as illustrated in FIGS. 3 and 4, as required.

It will also be apparent that the application of heat to the outer die bolt results in the application of a tensile force to the inner die bolt, and this force is applied in a direction to cause the die lip to be moved along its plane of movement away from the opposed die lip, to widen the extrusion gap and increase the gauge of the film being extruded. Similarly, removal of heat energy from the outer die bolt causes a decrease in tensile force or even a compressive force to be applied to the inner die bolt which is transmitted by the inner die bolt to cause the inner die bolt to move in such a direction as to decrease the film gauge.

Figure 7:
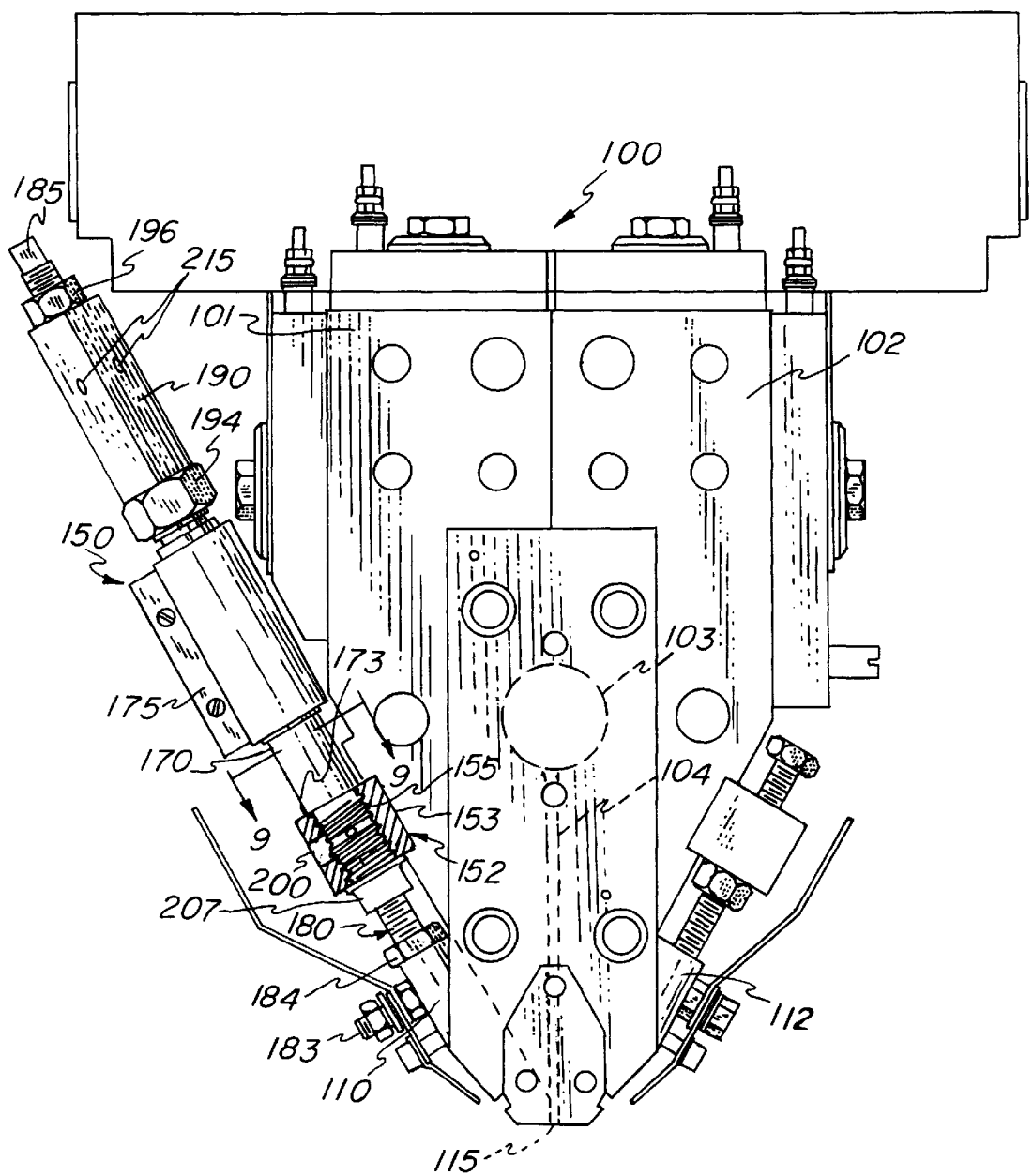
FIG. 7 is a view similar to FIG. 1 of a further embodiment of an actuator in accordance with this invention, with parts shown partially in section.
Figure 8:
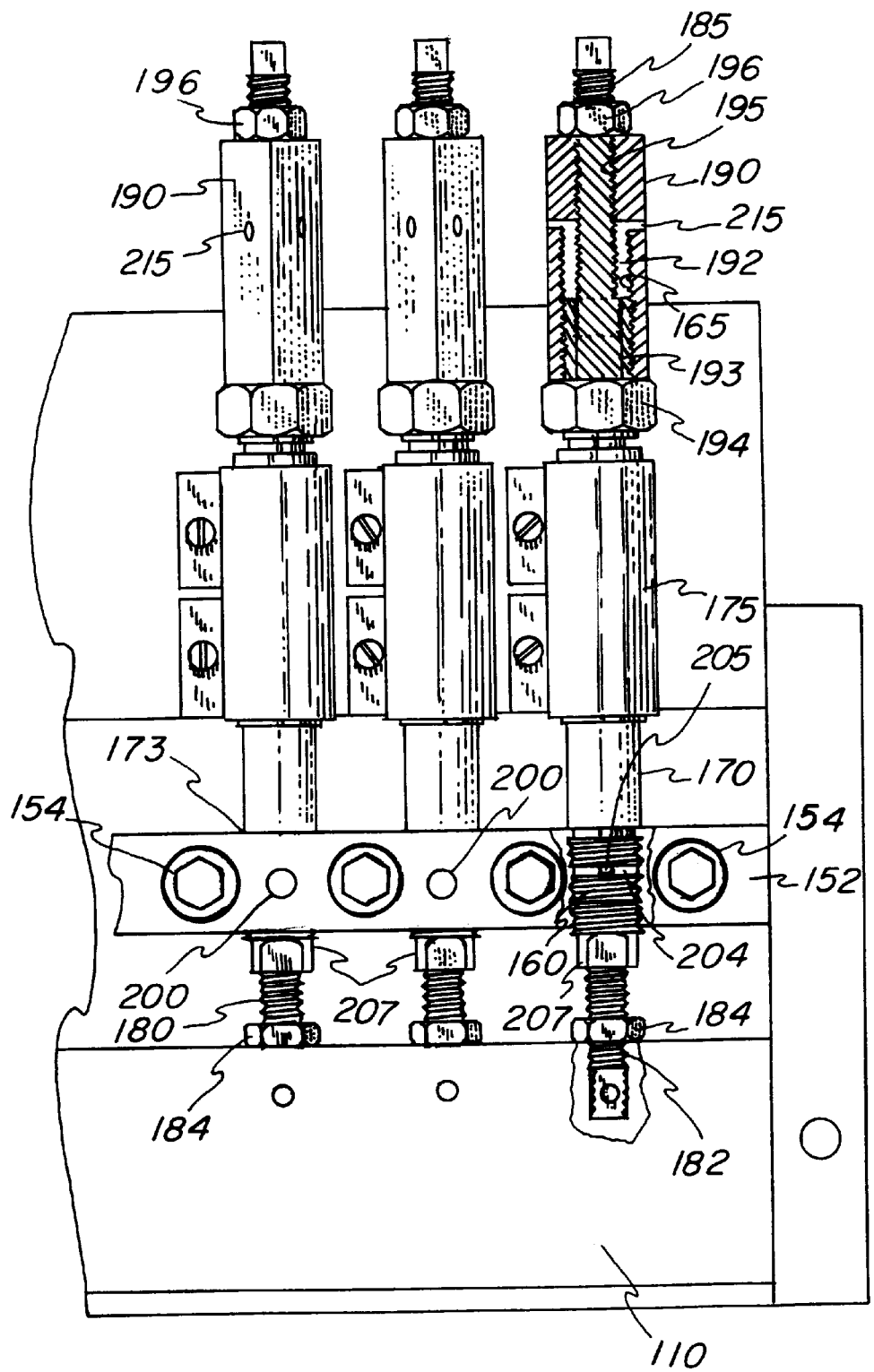
FIG. 8 is a fragmentary side view of a flat film die with a bank of actuators for controlling the position of a die lip according to FIG. 7.

Referring to FIGS. 7 and 8, which illustrate a further preferred embodiment of the actuator and system of this invention, a flat film extruder die is illustrated generally at 100, in end view, having opposed die bodies 101 and 102 defining therebetween a common extruder main passage 103 and a common die slot 104. A pair of die lips 110 and 112 are mounted respectively on the bodies 101 and 102, on bottom mutually sloping and intersecting surfaces, and are moveable in planes parallel to these mounting surface for regulating the width of an extrusion gap 115.

For the purpose of this embodiment, the flat film extrusion die 100 and the associated die lips 110 and 112 are the same as that which has been described above in connection with FIGS. 1 and 2 for the die 30 and the respective die lips 32 and 34. Thus, the die lips 110 and 112 are in the form of transversely elongated bars which extend the width of the die and which can be moved for adjustment in a direction parallel to their respective sloping or inclined mounting surfaces, as previously described in connection with the die lip surfaces 40 and the abutting body portions 42 and 43 of the embodiment of FIGS. 1 and 2.

An improved thermal actuator according to this invention is illustrated generally at 150 in FIGS. 8 and 8. The actuators 150 are spaced longitudinally along one of the die body portions 101 or 102, such as the die body portion 101 illustrated in FIG. 8, as mounted on an elongated mounting bar 152. The mounting bar 152 has a portion received within a slot 153 formed in the inclined outer lower surface of the body portion 101 and is firmly locked in place by the mounting bolts 154.

The bar 152 forms the clamping means by which the actuators 150 are fixably mounted to one of the die body portions. The bar 152 is generally rectangular in shape and is provided with transversely extending openings into which the fasteners or bolts 154 (FIG. 8) are threaded into the die body portion 101, to hold the bar 152 fixably into position, as shown. The bar 152 is further provided with a plurality of intervening tapped and threaded openings 155 for receiving the threaded inner end 160 of an outer annular heat extensible or thermal bolt 170.

Figure 9:
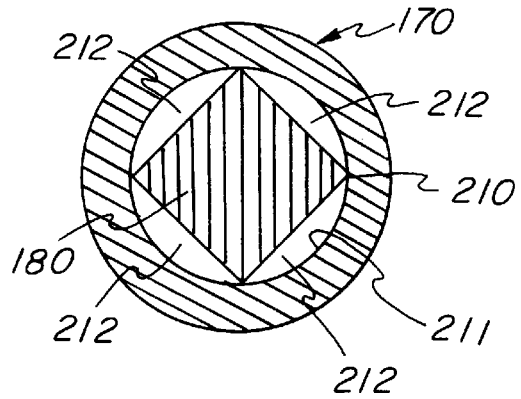
FIG. 9 is a sectional view through the actuator of FIG. 7 looking generally along the line 9—9.

As shown in the sectional view of FIG. 9, the inner end 160 of the bolt 170 is threaded so as to be received within the threaded bar opening 154, and is shouldered at 173 to define a seated position of the bolt with respect to the bar 152. This embodiment differs from that of FIGS. 1 and 2 in that the outer bolt 170 is not, itself, adjustable on the die body but is seated on the bar 152. The die lip adjustment is provided at the coupling between the inner and outer bolts, as described in further detail below.

The outer annular bolt 170 supports, along a portion of its length, an external electric heater 175 by which the die bolt 170 is heated. The heater 175 is tightly clamped about an outer surface of the outer annular die bolt, and power may be applied to the heater 175 independently of power applied to the heaters of the other actuators 150.

The actuator 150 also includes an inner die bolt 180 which is proportioned to extend through the outer bolt 170 with a lower or inner end which extends below the bolt 170, through the threaded inner end 160. The bolt 180 has a threaded inner or lower end 182 which extends through the opposite end of the bolt 170 below the support bars 150.

The extreme lower threaded end 182 of the inner bolt 180 is threaded into an aligned opening formed in the die lip 110. Its position is accurately and adjustably maintained by a lock or jam screw 183 in the die lip and bears against a flat formed on the end 182. Also a jam nut 184 is threaded on the end 182 and bears against the body of the die lip 110.

The outer or opposite remote end 185 of the inner bolt 180 extends outwardly of and above the outer annular bolt 170. The respective outer ends of these bolts are mechanically and adjustably coupled together at a thimble 190. The thimble is formed with an internal recess 192 which is internally threaded to be received over the threaded outer or upper end 193 of the bolt 170, and is adjustably positioned with respect to the bolt by the position of a jam nut 194. The thimble 190 is also internally threaded at 195 to receive the threaded outer end 185 of the bolt 180 therethrough, which position is maintained by a further jam nut 196 on the threaded end 185 and in engagement with the upper surface of the thimble 190. Accordingly, the relative position of the inner bolt 180 may be adjusted by relative rotation of the thimble 190 with respect to the bolt 180, and locked into position by the jamb nut 196. Similarly, the thimble itself may be positioned with respect to the outer bolt 170 by rotatably adjusting its position and locking the same with a jamb nut 194. This arrangement creates a differential thread assembly to enable very fine adjustment.

The bar 152, at each threaded actuator receiving opening 155, is provided with an air inlet opening 200. The lower or inner end 160 of the outer annular bolt 170 is formed with a circumferential air inlet recess 204 and with four quadralaterally spaced radial air inlet openings 205 through which air may flow into the interior of the annular bolt. The bar opening 154 is closed by a plug 207 which is threaded into the bottom end of the support bar 152 and which is flanged to form a close clearance fit with the lower end of the inner bolt 180, to form an air seal. The plug 207 also acts as an internal jam nut to remove thread backlash between outer bolt 170 and bar 152.

The major length of the inner bolt 180 between the threaded ends 182, 184 is rectangular in cross-section, as shown in the sectional view of FIG. 9. The corners 210 of the rectangular section form a close clearance fit with the inside wall 211 of the annular bolt while the spaces therebetween identified at 212 form an air passage which extends the entire length of the outer or annular bolt and extends a major portion of the length of the inner bolt 180 for the passage of cooling air over the inner bolt. The close clearance fits between the corners 210 and the cylindrical surface 212 provides mechanical compressive support for the inner bolt. Air escape openings 215 are provided in the wall of the thimble 190 at the opposite end of the passageway defined between the respective bolts.

Figure 10:
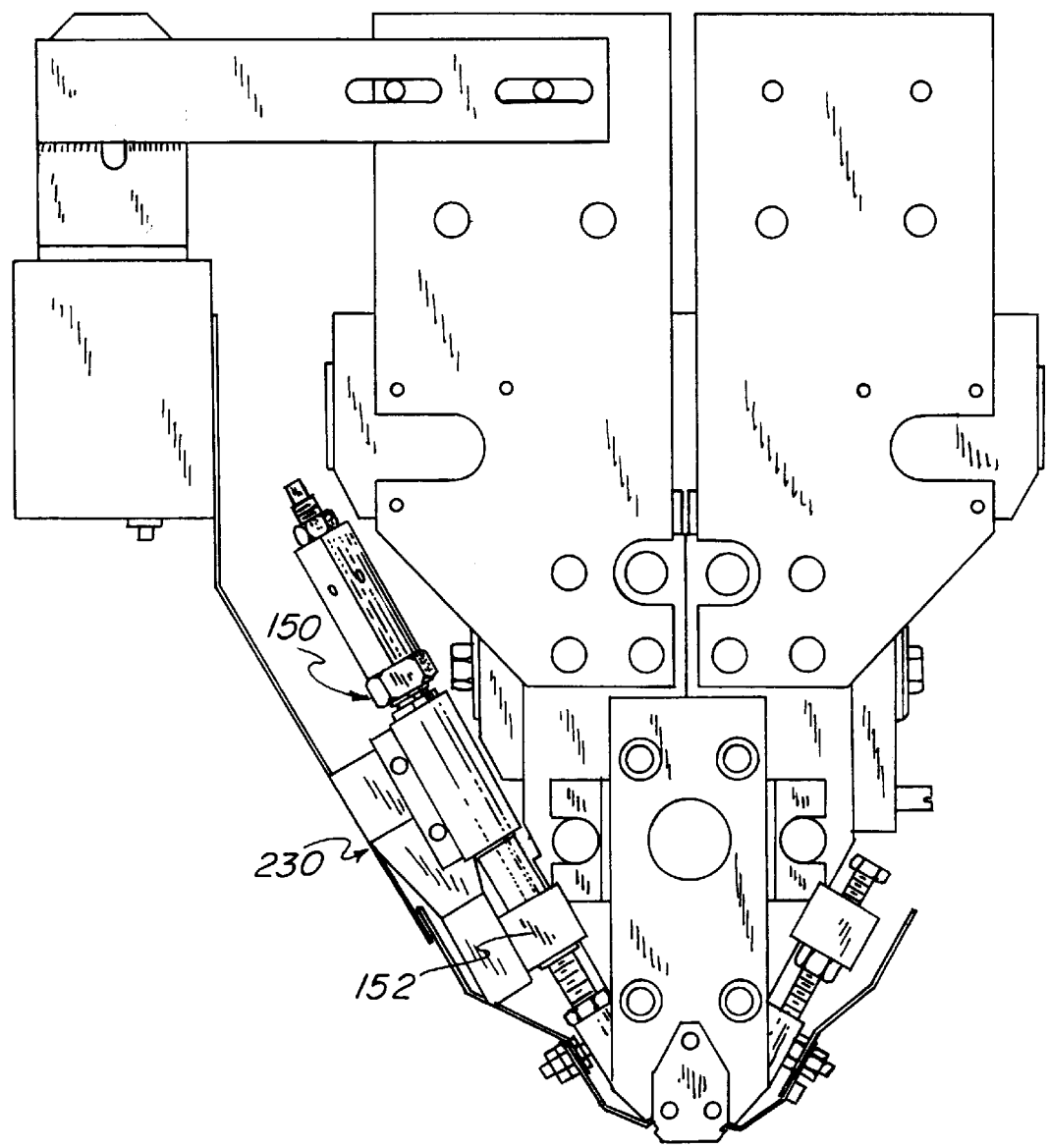
FIG. 10 is a fragmentary end view of the actuator of FIG. 7 as mounted on an extrusion die, with the air bar attached.
Figure 11:
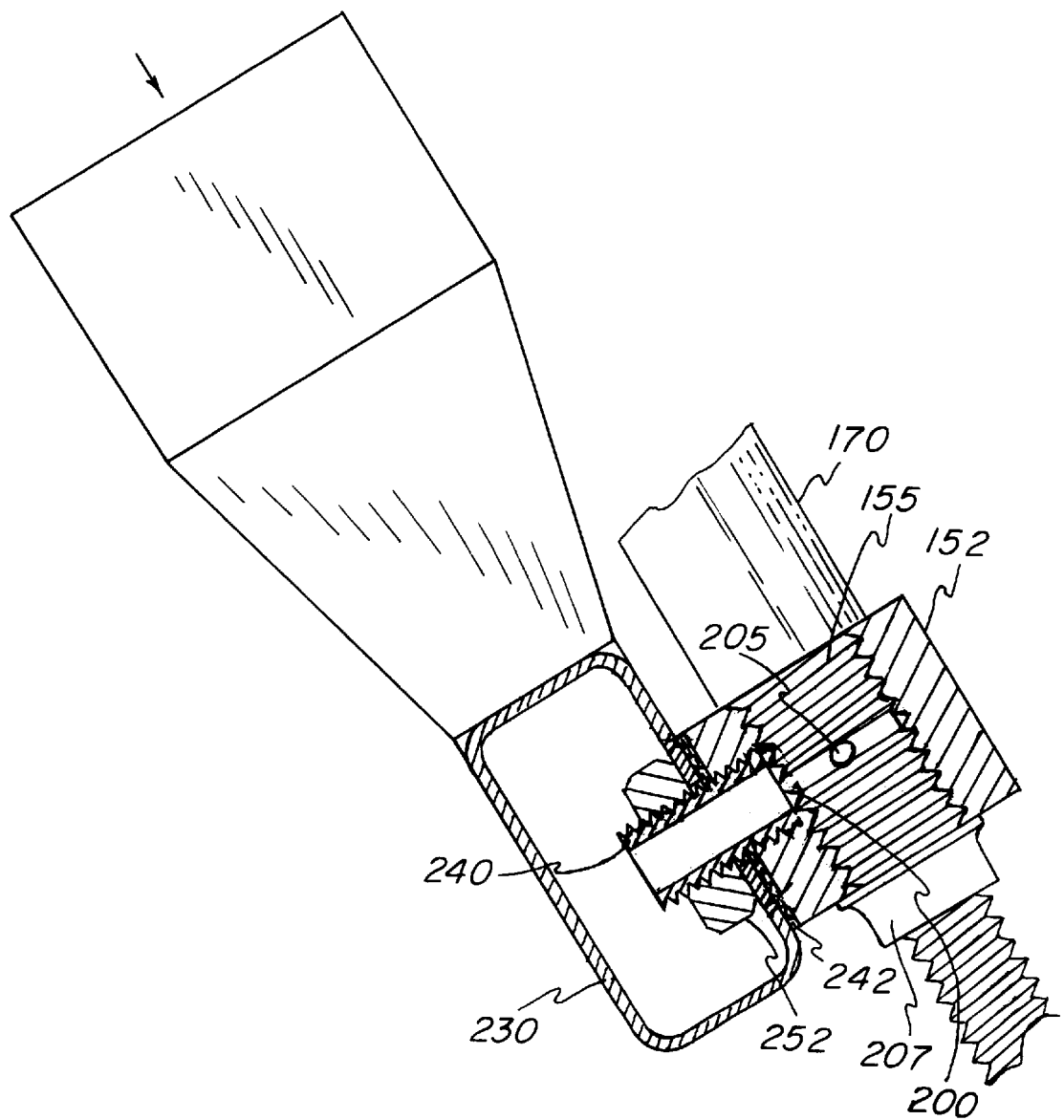
FIG. 11 is an enlarged fragmentary view of FIG. 10 showing details of the attachment of the air bar.
Figure 12:
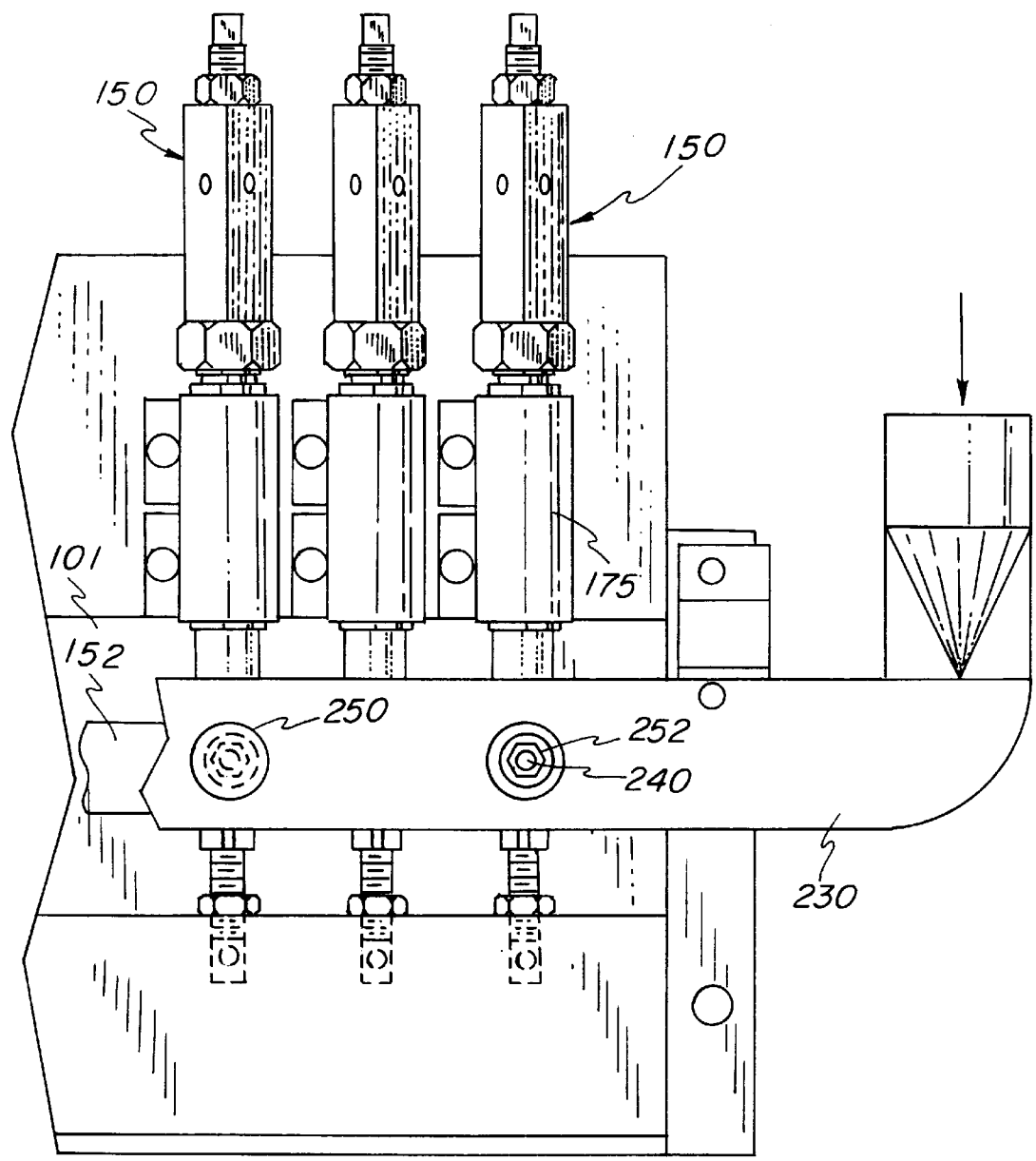
FIG. 12 is a fragmentary side view similar to FIG. 8 and showing the attachment of the air bar to the actuators.

As shown in FIGS. 10–12, a generally rectangular air supply bar 230 is provided for delivering air under low pressure to each of the actuators through the air inlet opening 200 formed in the support bar 152. The air supply bar 230 extends along the length of the die with openings aligned with each of the actuators and has open ends. Air may be supplied at each open end of the bar 230 from a blower, so that the air flows from the ends to the middle, for delivery through each of the actuators.

A threaded nipple 240 has one end threaded into the bar 152 at each opening 200 and extends outwardly therefrom, as shown in FIG. 11. The nipple 240 extends into an opening formed in the inner side wall of the bar 230, and is sealed at the bar 152 by a gasket 242. At a plurality of positions along the length of the die, the bar is further provided with outer removable access plugs 250 closing an access opening. A flat nut 252 is threaded on the exposed end of the threaded nipple 240 in the bar 150 opposite each such access opening to retain the air bar 230 in place on the support bar 152. The openings are then closed by replacing the plug 250.

In the set up of the actuators, the die lip is adjusted to a desired intermediate position or gap with respect to the opposed die lip, and the thimble 190 is adjusted and locked into position with respect to the inner and outer die bolts, thereby coupling the outer ends of these die bolts together so that they must move in unison. This is done under substantially neutral conditions without applying any substantial tension or compression in the inner die bolt 180 and at some midpoint power level. This allows inward and outward movement of the inner bolt 180, to both open and close the die gap.

Thereafter, in operation, the die and its internal passageways are conventionally heated, such as by hot oil and/or electric heating, to maintain the desired internal die temperature. One or more heating rods may also be placed external to the die, along the die lips, as necessary.

Fine control over the gauge thickness is accomplished by applying a cooling flow to the inner bolt 180, through the air bar 230, such as by applying air at each end from a small air blower, not shown, at a constant relatively low pressure, such as about 1 cfm/bolt. Simultaneously, heat is applied to the heaters 175 as necessary, and the application of heat will cause the moveable die lip to be moved in a direction, by applying tension to the inner bolt 180, so as to widen the extrusion gap as previously described in connection with the embodiment of FIG. 2. The removal of heat at any location, accompanied by the constant cooling bias on the inner rod, results in the narrowing of the gap at such locations by placing the inner bolt in compression, and the die lip 110 will be caused to be bent about its axis parallel to its mounting surface to accommodate such minor adjustments. In this manner, a uniform gauge thickness may be maintained across the full length of the die lip.

Figure 13:
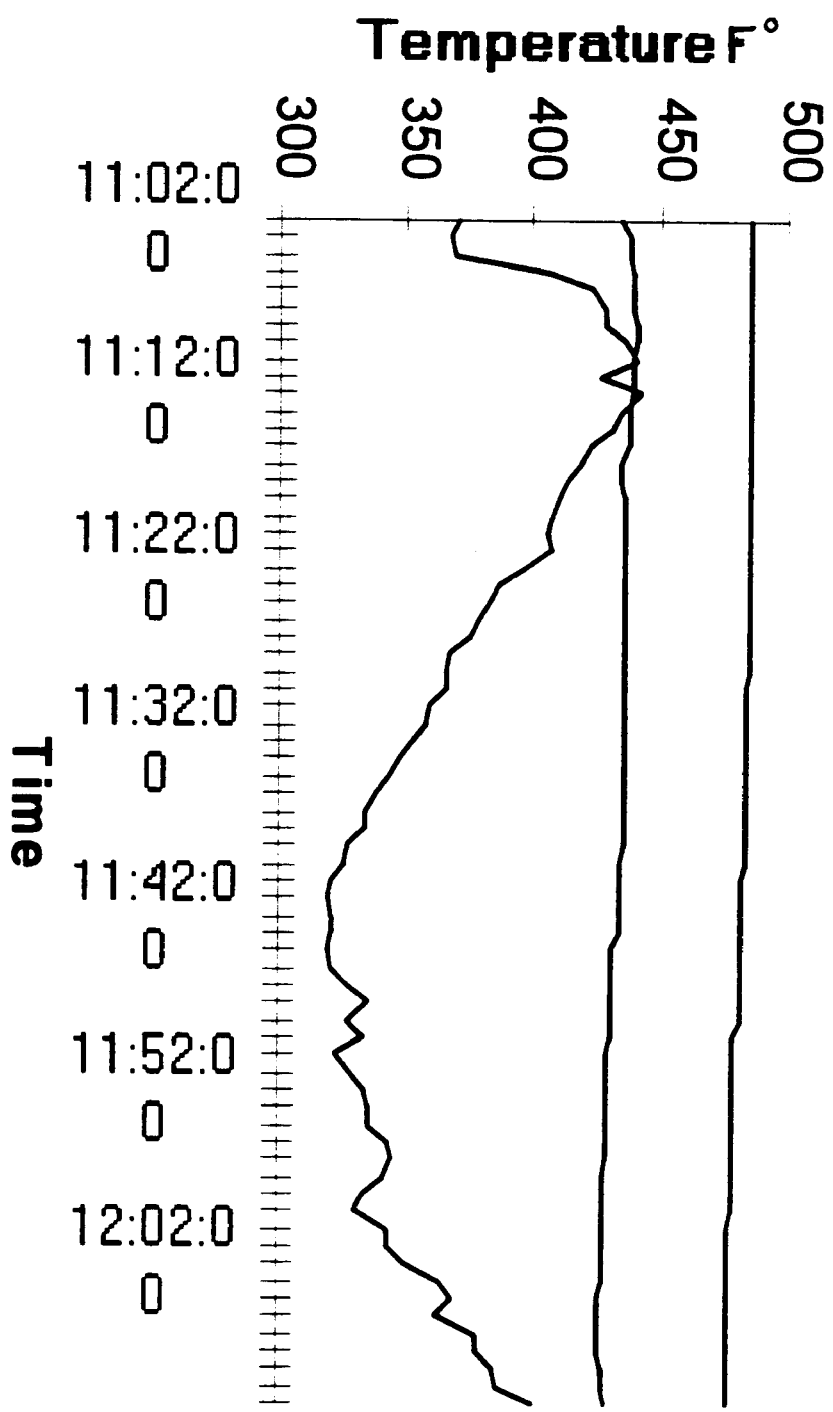
FIG. 13 is a graph of die lip temperature with variations of thermal actuator temperature.

Since the inner bolt is constantly thermally biased by cooling, the heating of the outer bolt has little effect upon the viscosity of the extruded material since little of the heat from the outer bolt will migrate into the die lip through the outer bolt and the actuator mounting bar connection. This can be seen by reference to the diagram of FIG. 13. A die constructed according to FIGS. 7–12 was equipped with thermocouples for measuring temperature at the outer die bolt 170, the inner rod 180, and at the moveable die lip 110. The temperatures were stabilized and then the temperature of the outer die bolt as represented by line 300 on the graph was varied from a maximum of just less than 450 to a minimum of about 325 and the temperatures of the inner die bolt as represented by graph line 310 and the die lip as measured by graph line 320 were recorded while the inner die rod was being cooled with a constant flow of cooling air, as previously described. It may be seen from FIG. 13 that no noticeable excursions of the die lip temperature or the inner bolt temperature were recorded between the significant maximum and minimum excursions of the outer bolt temperature 300 indicating that the temperature of the die lip is maintained relatively independent of the actuating temperature of the outer bolt 170.

The method practiced by the invention for controlling the extrusion gap of a slot-type film extruding die, in which at least one longitudinally extending external die lip is mounted for adjustment on an external planar surface of a die body, and in which the die lip may be bent in the plane for adjusting variations in film gauge, may be described by the steps of applying a plurality of actuators along the longitudinal length of the external die lip in relatively uniformly spaced relation to each other. The output forces of the actuators are in a common plane which common plane is parallel to the surface plane of the die body on which the die lip is mounted. The relative heating and cooling of each of the actuators is controlled in accordance with the film gauge desired at the position of the die lip as represented by the actuator to cause adjusting movements of the die lip accompanied by bending of the die lip. The film gauge is increased by applying heat to the actuators, and is decreased by removing such heat.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

I claim:

1. A thermal actuator system for controlling the position of a moveable die lip associated with the body of a plastic film extruder die with respect to another die lip to control the width of an extrusion gap between the die lips, comprising:

an outer annular bolt having an inner end and an outer end, annular bolt inner end body mounted fixed relation to the extruder body, an inner bolt received within said annular bolt and having an inner end extending through said annular bolt inner end and having an outer end connected with said annular bolt outer end, the said inner end of said inner bolt being attached to said moveable die lip, said inner bolt defining with said annular bolt a cooling passageway between the outer surface of the inner bolt and the inner surface of said outer bolt, a cooling air inlet at said one end of said annular bolt opening into said cooling passageway and a cooling air outlet at the other end of said annular bolt opening into said passageway providing for flow of cooling air through said passageway along the outside surface of said inner bolt, and a heater associated with said annular bolt for heating said annular bolt with respect to said inner bolt.

2. The system of claim 1 in which said moveable die lip comprises a bar external to and mounted on said die body for sliding movement on said body slot under the influence of said inner die bolt for varying the width of plastic extrusion through said extrusion gap.

3. A thermal actuator system for controlling the position of a moveable die lip associated with the body of a flat film plastic extruder in which the moveable die lip is mounted on an exterior surface of the die body and is moveable by bending said die lip in a plane parallel to said surface in intersecting relation to an extrusion plane through an elongated extrusion slot to control the width of extrusion from such slot, comprising a plurality of substantially identical heated thermal actuators arranged longitudinally of said die body and each having a force output end connected to said die lip to cause said die lip to bend in said plane and move along said surface in gauge controlling relation to said extrusion slot, each of said actuators having an outer annular bolt and an inner bolt, said outer annular bolt having an inner end attached to said extruder body and an outer end extending from said body, said inner bolt being substantially received within said annular bolt and having an outer end thereof joined with said outer annular bolt outer end, said inner bolt inner end extending through the inner end of said annular bolt and joined in force applying relation to said die lip for directing force substantially parallel to the plane of movement of said die body, said inner and outer bolts defining therebetween a cooling passageway extending the length of said outer annular bolt and along said inner bolt, a cooling inlet at the one end of said annular bolt and opening into said cooling passageway, a cooling outlet at the other end of said outer annular bolt opening into said passageway providing for flow of cooling fluid through said passageway, means for applying cooling fluid under pressure to said inlet for causing said cooling fluid to move through said passageway along the outer surface of said inner bolt to said outlet, a heater associated with said annular bolt for differentially heating said outer annular bolt with respect to said inner bolt so that relative heating of said outer annular bolt applies a tensile force to said inner bolt tending to bend said die lip in said plane to widen said extrusion slot, and relative cooling of said outer bolt to said inner bolt causes a compressive force to be applied to said inner bolt tending to bend said die lip in said plane in a direction to close said extrusion slot, said actuator being capable of withstanding full expansion and contractive movement of said outer annular bolt without damaging said inner bolt.

4. In a thermal actuator for controlling the position of a moveable die lip forming part of an extruder body for the extrusion of plastic film with respect to the position of a second die lip, to control the gauge of the plastic film, the improvement comprising an outer annular thermal bolt having an inner end and an outer end, said inner end of said outer annular thermal bolt being secured to said extruder body, an inner bolt received at least partially within said outer annular thermal bolt and having an inner end extending through said annular thermal bolt inner end and connected to said moveable die lip and having an outer end, an adjustable connector on said annular thermal bolt outer end connected to said outer end of said inner bolt, a cooling passageway formed between said outer annular thermal bolt and said inner bolt and extending along the axial length of said outer annular thermal bolt, a cooling fluid inlet formed on one end of said outer annular thermal bolt opening into said cooling passageway and a cooling fluid outlet formed at the other end of said outer annular thermal bolt providing for flow of cooling fluid through said cooling passageway along said inner bolt, means for applying a flow of cooling fluid to said cooling fluid inlet for flow through said passageway and said cooling fluid outlet, a heater mounted on said outer annular thermal bolt for heating said outer annular bolt with respect to said inner bolt for causing differential expansions of said bolts accompanied by movement of said inner end of said inner bolt and said moveable die lip with respect to said extruder body.

5. The actuator of claim 4 further comprising the portion of said inner bolt received within said outer annular thermal bolt having flat sides extending to corners in which said corners form a close fit with the inner surface of said outer annular thermal bolt providing support for said inner bolt against buckling.

6. The method of controlling the extrusion gap of a slot type film extruding die in which at least one longitudinally extending external die lip is mounted to a planar exterior surface of the body of the die defining a surface plane and is moveable along such surface plane for adjusting the extrusion gap, and which die lip may be bent parallel to said plane for adjusting variations in the gauge of the film extruded from said die comprising the steps of using differential expansion bolt actuators in which an outer annular bolt is heated and an inner bolt is cooled by air flow along the length of the space between said bolts thereby providing a variable output force between the outer annular bolt and the inner bolt, applying a plurality of such actuators along the longitudinal length of said external die lip in mutually and relatively uniformly spaced relation to each other, with the output force of each of such actuators directed in a common plane which common plane is parallel to the surface plane, applying a relatively constant flow of cooling air along the length of said inner bolt, and controlling the relative heating and cooling of said actuators in accordance with the film guage desired at the position of said die lip represented by such actuator, to cause adjusting movement of said die lip as caused by said bending of said die lip.

7. The method of claim 6 in which the film gauge is increased by applying heat to said actuators.

* * * * *